S. C. MOORE.

Lamp.

No. 6,374. Reissued April 13, 1875.

Witnesses.
D. M. Shumway
A. J. Tibbits

The Benedict & Burnham Mfg Co.
assignees of Samuel C. Moore.
Inventor
By Atty.
John E. Earle

THE GRAPHIC CO. PHOTO-LITH. 39 & 41 PARK PLACE, N.Y.

UNITED STATES PATENT OFFICE.

SAMUEL C. MOORE, OF BOSTON, MASSACHUSETTS, ASSIGNOR, BY MESNE ASSIGNMENTS, TO THE BENEDICT AND BURNHAM MANUFACTURING COMPANY, OF WATERBURY, CONNECTICUT.

IMPROVEMENTS IN LAMPS.

Specification forming part of Letters Patent No. 83,874, dated November 10, 1868; reissue No. 6,374, dated April 13, 1875; application filed August 28, 1873.

*To all whom it may concern:*

Be it known that I, SAMUEL C. MOORE, of Boston, in the county of Suffolk and State of Massachusetts, have invented a new Improvement in Lamps; and I do hereby declare the following, when taken in connection with the accompanying drawings and the letters of reference marked thereon, to be a full, clear, and exact description of the same, and which said drawings constitute part of this specification, and represent in—

Figure 1:
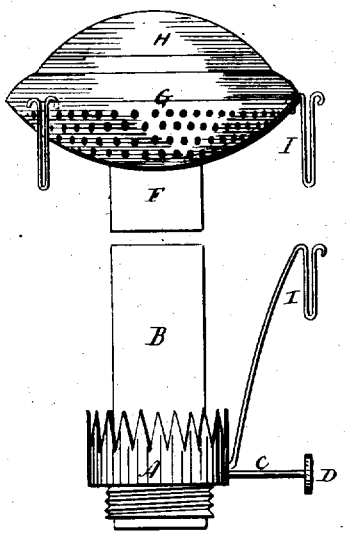
Figure 2:
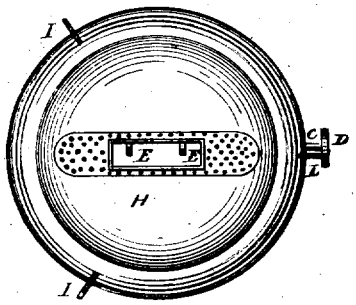

Figure 1, an elevation of a lamp top or burner, with my improvements; Fig. 2, a plan or top view of the same; and, in Fig. 3, a side and end view of the transversing or outer tube by which the adjustment of the deflector is effected, showing the said tube corrugated.

In this invention the pervious or air-distributing plate is connected with and at or near the base of the deflector; and the invenvention consists in combining therewith chimney-supports, which form rests for the lower edge of the chimney below the air-distributing plate, and means made elastic so as to be self-adjusting to the variable diameters of chimneys for supporting the chimney laterally at or near the periphery of the combined deflector and perforated air-distributing plate, so that its inner periphery may be maintained in a proper relation to the periphery of the combined cap and perforated air-distributing plate. In this way the lower part of the chimney is kept cool by the currents of air passing in to feed the flame, and as these currents of air have to pass under the lower edge of the chimney, and then upward in a vertical direction before reaching the perforations in the air-distributing plate, all tendency to agitate the flame by violent currents is effectually prevented, while at the same time a full and free supply of air is admitted to the flame both above and below the deflector.

A is the screw plate or cap holding the wick-tube B, and fitted to screw into the top of the oil-reservoir or vessel, and provided with the usual shaft C, finger-button D, and notched feed-wheels E E, for adjusting the wick as required. F is an external tube fitted to slide up and down on the outside of the wick-tube B, so that it may be readily adjusted higher or lower on the wick-tube, and there held by the friction of one tube against the other to adjust the deflector to the required size of the flame, and thereby regulate the light and avoid the tendency to smoke.

The form of the air-distributer or perforated draft-plate G may be slightly varied, but the form represented in Fig. 1 has been found to answer a good purpose. Its outer periphery is attached or connected with the cap H or deflector, and the outer periphery of this combined deflector or cap and perforated air-distributer should be nearly in contact with the chimney when in place, there being some provision for the passage of air to the flame above the deflector.

To support the chimney with its lower edge below the perforated air-distributer, for the purpose of improving the draft, keeping the lower part of the chimney comparatively cool, and effectually preventing the agitation of the flame, I fasten elastic-wire hangers or loops I I to the edge of the said combined distributing-plate and deflector, as shown in the upper part of Fig. 1, so that they hang down below the under part of the perforated plate, extend up to give lateral support to the chimney, and support it relatively to the periphery of the deflector; or, as the equivalent thereof, these chimney-supports or wires may be fastened to the screw-cap A, and extend upward, substantially as in the manner shown in the lower part of Fig. 1, so as to support the chimney at the proper height, as above described, it being essential that this lateral support should be elastic to accommodate itself to the unavoidable variation in the diameter of chimneys.

Figure 3:
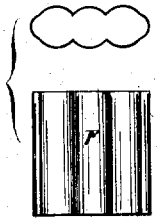

The deflector or cap and perforated plate may be placed a little apart, and be connected so that less heat may be communicated from the cap above to the perforated plate beneath. Also, the sliding tube F may be made corrugated, as represented in Fig. 3, and it will then allow the air to pass up between the tubes and thus keep them, particularly the outer one, much cooler than they would otherwise be, and consequently less heat will be communicated to the perforated plate they support.

I claim as my invention—

The connected air-distributing plate and cap, or deflector, and the chimney-rests or supports forming rests for the lower edge of the chimney below the air-distributing plate, in combination with an elastic device for supporting the chimney laterally at or near the periphery of the connected deflector and air-distributing plate, substantially as specified.

SAMUEL C. MOORE.

Witnesses:
F. A. CURTIS,
WM. C. WOOD.